March 10, 1925.  1,529,225
J. M. STRANG
RANGE FINDER FOR SUBMARINE AND OTHER PERISCOPES
Filed June 17, 1921
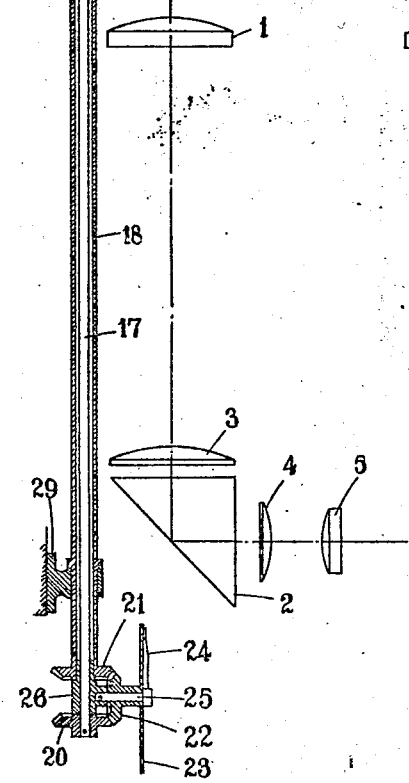
Fig. 1.
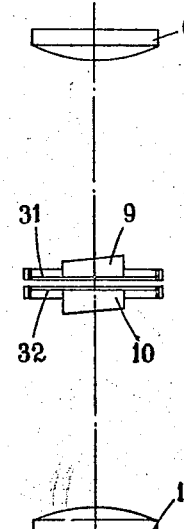
Fig. 2.
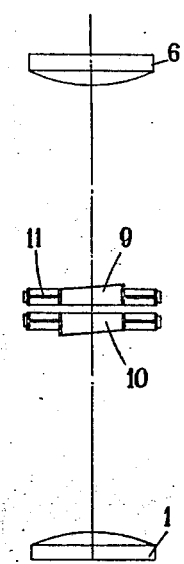
Fig. 3.
Fig. 4.
Fig. 5.
INVENTOR
John Martin Strang
By J. Walter Fowler
Attorney Patented Mar. 10, 1925.

1,529,225

UNITED STATES PATENT OFFICE.

JOHN MARTIN STRANG, OF GLASGOW, SCOTLAND, ASSIGNOR TO BARR AND STROUD, LIMITED, OF GLASGOW, SCOTLAND.

RANGE FINDER FOR SUBMARINE AND OTHER PERISCOPES.

Application filed June 17, 1921. Serial No. 478,305.

*To all whom it may concern:*

Be it known that I, JOHN MARTIN STRANG, a subject of the King of Great Britain and Ireland, and of Caxton Street, Anniesland, Glasgow, Scotland, have invented new and useful Improvements in Range Finders for Submarine and Other Periscopes, of which the following is a specification.

My invention refers to submarine and other periscopes, hereinafter and in the claims referred to generally as periscopes, of the type comprising a telescope system provided with at least two consecutive objectives between which the beam is composed of parallel rays, and the object of my invention is to furnish periscopes of this type with improved means for the measurement of ranges which in operation are obtained from a known (or assumed) length at the target and a measurement of the angle subtended by this known length at the periscope. In the claims periscopes of this type will be referred to as periscopes of the type defined.

According to my invention I insert between two consecutive objectives of the telescope system of a periscope of the type defined a refracting prisms system in the path of a part of the beam the rays of which are parallel and I provide means for imparting to the prisms of the system rotary movements whereby variable and adjustable deviation may be produced so that in the field viewed by an observer two images may be seen, one produced by rays which do not pass through the refracting prisms system, the other by rays which pass through the refracting system, or a single image may be produced if the refractions produced in the prisms system nullify each other. For example, in one method according to my invention I use a pair of equally refracting prisms of annular form and place them between two consecutive objectives, and for measurement of angle I provide means so that these prisms may be rotated equally in opposite directions. Further, if observations of angular magnitude are required to be made either in a vertical, horizontal or inclined direction, I make provision whereby the pair of prisms can be rotated together bodily.

It will be clear that the two prisms, being of equal angle, in one position when the one prism is exactly oppositely directed to the other, the effect will be that the two refractions are opposite and annul one another, the angular indication of measurement then being zero. This position corresponds to the case where we get a single image in the field of view without any duplication.

If we require to measure a vertical angle the pair of prisms are rotated bodily together till the duplication of the image (formed by the relative rotation of the prisms) is in the vertical direction, and the angle is measured in the manner to be described. An analogous procedure will enable horizontal angles to be measured.

An example of means for the relative rotation of the two prisms and the bodily rotation of the two prisms together will now be given. We may provide teeth round the circular support of each prism and drive each prism by means of a pinion wheel. If the two shafts carrying these pinion wheels are concentric to one another and parallel to the axis of the periscope, they may be led down below the bottom of the periscope case where a differential gear may be provided, one bevel wheel being fixed to the outer shaft and the second bevel wheel to the inner shaft while the axis of the jockey wheel is provided with a drum or disc upon which a scale of angles is engraved. If the axis of the jockey remains fixed a rotation of the drum or disc will produce duplication of the image in a particular direction, say, vertical, but if the axis of the jockey be rotated through any one or more revolutions or fraction of a revolution about a vertical axis, the prism system will be rotated bodily together so that the duplication will now take place in a different direction, say, horizontally.

Instead of using concentric annular prisms, i. e., prisms in which circular holes have been cut, we may, for example, use much smaller prisms placed opposite the central region of the objective and support these prisms on suitable glass plates, or by means of spiderlike holders. In this case the beam of light to remain unrefracted during the rotation of the prisms will be the annular portion meeting the objective. Or again, the two prisms may be unperforated and placed opposite about one half of the objective.

Examples of a few methods of carrying out this invention will now be described with reference to the accompanying drawing in which:—

Figure 1 is a vertical section through the lower part of an ordinary periscope furnished with prisms and operating gear according to my invention.

Figures 2 and 3 are vertical sections illustrating modifications of a portion of Figure 1.

Figure 4 is a plan of the prism holder in Figure 3, while Figure 5 is a plan illustrating a modified arrangement of prism and another form of holder.

In Figure 1 the objective of the lowermost telescopic system is designated 1, the reflecting prism 2, and the eyepiece combination 3, 4, 5. The objective of the telescopic system next above the lowermost is designated 6 and in accordance with this invention I place the refracting prisms between the objectives 1 and 6. In Figure 1 this mechanism consists of two annular refracting prisms 7 and 8 formed with central circular holes 13 and 14 provided and arranged concentrically with the axis of the objectives. The holders of these prisms are provided with teeth on the periphery engaging respectively with pinions 15 and 16. The upper pinion 15 is fixed to a shaft 17, which passes concentrically through a tubular shaft 18 to which 16 is fixed. Brackets 19 and 29 are provided for supporting shafts 17 and 18 from the periscope at the upper and lower ends respectively.

At the lower end of shaft 17 is fixed a bevel 20 and at the lower end of shaft 18 is fixed a bevel 21; a bevel 22 (carrying a graduated disc 23) gears with 20 and 21. Bevel 22 is mounted to rotate on a shaft 25. The shaft 25 is fixed to a piece 26 mounted to turn about the axis of the shaft 17 and carries a pointer 24 which forms an index whereby the graduated scale upon 23 may be read. If now disc 23 be turned by hand about shaft 25, the two prisms 7 and 8 are rotated in opposite directions so that the relative positions can be read off at any time by the position of pointer 24 upon disc 23. We may suppose that the position shown in the figure corresponds to that suitable for measuring angles in a horizontal plane. If now we desire to measure angles in a vertical plane, shaft 25 requires to be turned about the axis of shaft 17 through the appropriate angle depending upon the ratio of the pitch diameters of 15 and 16 to the pitch diameters of the holders of the prisms 7 and 8. Thus, e. g., if this ratio is 1:4, it will be necessary to turn shaft 25 through just one revolution whereby the prisms are rotated bodily together from the position suitable for measurements in the horizontal plane to that required for operating in the vertical plane after which, for the measurement of angle, the prisms are rotated equally in opposite directions.

In Figure 2, the concentric annular prisms are replaced by circular and much smaller prisms 9 and 10 placed opposite the central region of the objective and supported on glass plates 31 and 32 respectively.

In Figure 3, these prisms are supported by a spider-like frame 11 seen in plan in Figure 4.

Figure 5 shows a plan of a modification in which the prisms are placed opposite a portion of one side of the objective, one prism 12 only being seen in this view.

I claim:—

1. A periscope of the type comprising a telescope system, two consecutive objectives in the telescope system, a refracting prisms system comprising two annular prisms situated between the two consecutive objectives in the path of part of the beam and arranged with their central holes concentric to the axis of the objectives and means for imparting to the prisms of the system rotary movements for obtaining the measurement of angles.

2. A periscope of the type comprising a telescope system, two consecutive objectives in the telescope system, a refracting prisms system comprising two equally refracting prisms of annular form situated between the two consecutive objectives in the path of part of the beam and arranged with their central holes concentric to the axis of the objectives and means for imparting to the prisms of the system equal and opposite rotary movements for obtaining the measurement of angles.

3. A periscope of the type comprising a telescope system, two consecutive objectives in the telescope system, a refracting prisms system situated between the two consecutive objectives, means for imparting to the prisms of the system relative rotary movements for obtaining the measurement of angles, and means for rotating the prisms of the system together bodily, for the purposes set forth.

4. A periscope of the type comprising a telescope system, two consecutive objectives in the telescope system, a refracting prisms system comprising two equally refracting prisms situated between the two consecutive objectives, means for imparting to the prisms of the system equal and opposite rotary movements for obtaining the measurement of angles, and means for rotating the prisms of the system together bodily, for the purposes set forth.

5. A periscope of the type comprising a telescope system, two consecutive objectives in the telescope system, a refracting prisms system comprising two annular prisms situated between the two consecutive objectives and arranged with their central holes concentric to the axis of the objectives, means for imparting to the prisms of the system relative rotary movements for obtaining the measurement of angles, and means for rotating the prisms of the system together bodily, for the purposes set forth.

6. A periscope of the type comprising a telescope system, two consecutive objectives in the telescope system, a refracting prisms system comprising two equally refracting prisms of annular form situated between the two consecutive objectives and arranged with their central holes concentric to the axis of the objectives, means for imparting to the prisms of the system equal and opposite rotary movements for obtaining the measurement of angles, and means for rotating the prisms of the system together bodily, for the purposes set forth.

7. A periscope of the type comprising a telescope system, two consecutive objectives in the telescope system, a refracting prisms system comprising two refracting prisms situated between the two consecutive objectives, two holders one for each prism, gear teeth on the periphery of each holder, two pinions gearing one with each holder, two shafts one for each pinion, and means for imparting to the shafts rotary movements, for the purposes set forth.

8. A periscope of the type comprising a telescope system, two consecutive objectives in the telescope system, a refracting prisms system comprising two refracting prisms situated between the two consecutive objectives, two holders one for each prism, gear teeth on the periphery of each holder, two pinions gearing one with each holder, two shafts one for each pinion, differential gear for operating the shafts associated with a graduated disc and pointer, for the purposes set forth.

JOHN MARTIN STRANG.